United States Patent [19]

Frerking

[11] Patent Number: 4,614,626

[45] Date of Patent: Sep. 30, 1986

[54] METHOD FOR FABRICATING A TENNIS RACQUET FRAME

[76] Inventor: James R. Frerking, 1424 Northview Dr., Westlake, Calif. 91362

[21] Appl. No.: 604,864

[22] Filed: Apr. 27, 1984

[51] Int. Cl.⁴ .................... B29C 67/22; B29C 53/36; B29C 53/56
[52] U.S. Cl. .................. 264/46.4; 264/46.9; 264/103; 264/285; 264/DIG. 66; 273/73 D; 273/73 F
[58] Field of Search ............. 264/46.4, 46.9, 103, 264/285, DIG. 66; 273/73 D, 73 F

[56] References Cited

U.S. PATENT DOCUMENTS

| | | | |
|---|---|---|---|
| 2,389,038 | 11/1945 | German | 264/DIG. 66 |
| 2,610,056 | 9/1952 | Lovell | 273/73 D |
| 2,859,936 | 11/1958 | Warnken | 273/73 F X |
| 3,787,051 | 1/1974 | Johns | 273/73 F |
| 3,892,831 | 7/1975 | Robin et al. | 264/103 |
| 3,966,207 | 6/1976 | Pass | 273/73 D |
| 4,124,670 | 11/1978 | Cecka et al. | 264/46.9 X |
| 4,256,680 | 3/1981 | Usui | 264/103 X |
| 4,294,787 | 10/1981 | Lo | 273/73 F X |
| 4,340,226 | 7/1982 | Haines | 273/73 F |
| 4,393,024 | 7/1983 | You | 273/73 F X |
| 4,440,392 | 4/1984 | Popplewell | 273/73 D X |
| 4,506,887 | 3/1985 | Trysinsky | 273/73 F |
| 4,511,523 | 4/1985 | Hsu | 264/DIG. 83 |

FOREIGN PATENT DOCUMENTS

| | | | |
|---|---|---|---|
| 1310470 | 10/1962 | France | 273/73 F |
| 54-104940 | 8/1979 | Japan | 273/73 F |

Primary Examiner—Philip Anderson
Attorney, Agent, or Firm—Edward A. Sokolski

[57] ABSTRACT

A tennis racquet frame is fabricated of graphite and has tubing member for receiving the strings internally molded in the frame so that the strings do not penetrate the outside rim of the frame. This end result is achieved by preforming pieces of plastic tubing in an elongated mold, the mold shaping these tubing pieces into optimum radii for receiving the stringing. The mold is filled with plastic and the elongated strip thus formed removed from the mold and placed into a second mold which has a pair of wires installed there in and running along the longitudinal extent thereof. Plastic foam is then placed in the second mold to form a foam core which retains the wires along the back thereof with the ends of the wires protruding from the foam. The foam core strip is then removed from the mold and while being held at its ends by means of the wires is rotated to wind graphite fibers therearound, along the entire length of the core. The graphite wound core is then molded in conventional fashion to form the frame.

10 Claims, 11 Drawing Figures

METHOD FOR FABRICATING A TENNIS RACQUET FRAME

This invention relates to tennis racquets and more particularly to a method for forming a tennis racquet frame from graphite.

In the fabrication of tennis racquets, holes are generally provided in the frame running from the inside to the outside rim thereof through which the stringing is run. Generally, grommets made of plastic tubing (spaghetti) which are cut to specific lengths are threaded along the entire length of the string so that when the stringing is completed, these grommets will be installed in the holes in the frame to protect the stringing against chafing by the racquet frame. It is also possible to individually insert the grommets in the holes in the frame, but this is a more difficult procedure. Either type of installation adds a great deal of labor to the stringing procedure and unless skillfully done may not provide the necessary insulation for the strings or may result in a less than esthetically pleasing end product.

In conventional racquets, the strings generally are strung through the holes on the frame at rather sharp angles which tends towards failure of the grommets and breakage of the strings.

In U.S. Pat. No. 2,610,056 to Lovell issued Sept. 9, 1952, a tennis racquet having a metal frame is described in which stringing holes are formed internal to the frame, these holes being lined with tubular bearing elements which are also of metal. These tubular bearing elements are given a radius of curvature such as to minimize strain on the strings. The frame of this racquet is formed by drilling out the needed holes in stock metal and then bending the metal to the desired shape in a suitable jig.

In recent years, tennis racquets having frames of plastic construction such as of graphite have come into great popularity. The present invention is directed towards a method for fabricating a plastic frame racquet which has pre-formed grommets installed internally within the frame, these grommets having optimum curvatures for the strings. This end result is achieved in the present invention by preforming the grommets from small pieces of plastic tubing which are installed in a mold which provides optimum curvature for the grommets for all portions of the racquet. The preformed grommets are than molded into an elongated strip by means of a plastic filler. The elongated strip is then placed in a second mold having a pair of wires which run along the entire longitudinal and extent thereof, the wires being joined to the elongated strip by means of a plastic foam. The wired strip is then suspended from its ends by the wires and rotated to wind graphite fibers around the core until the core is covered by the graphite material. The graphite wound strip is then molded conventionally to form the frame.

It is therefore an object of this invention to provide an improved method for fabricating a tennis racquet in which the stringing grommets are internal to the frame.

It is a further object of this invention to provide a method for fabricating a tennis racquet having a plastic frame which has improved characteristics.

Other objects of the invention will become apparent as the description proceeds in connection with the accompanying drawings of which:

Figure 1:
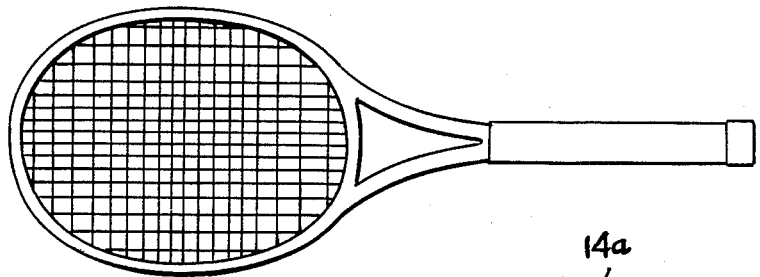
FIG. 1 is top plan view illustrating a tennis racquet produced by the method of the invention.
Figure 2:
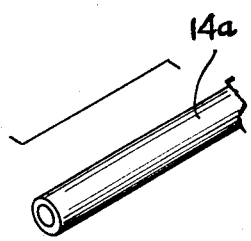
FIG. 2 is a perspective view illustrating the insertion of a rod into the plastic tubing in the method of the invention to avoid plugging of such tubing with plastic.
Figure 4:
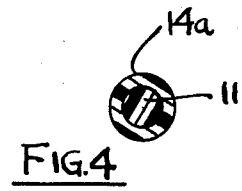
FIG. 4 is a cross sectional view taken along the plane indicated by 4—4 in FIG. 3.
Figure 3:
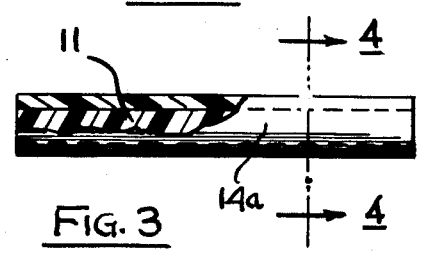
FIG. 3 is a side elevational view partially in cross section showing a Teflon rod installed in a plastic tubing section.
Figure 5:
FIG. 5 is a top plan view illustrating the mold employed in forming the tubing sections and molding them into an elongated strip.
Figure 6:
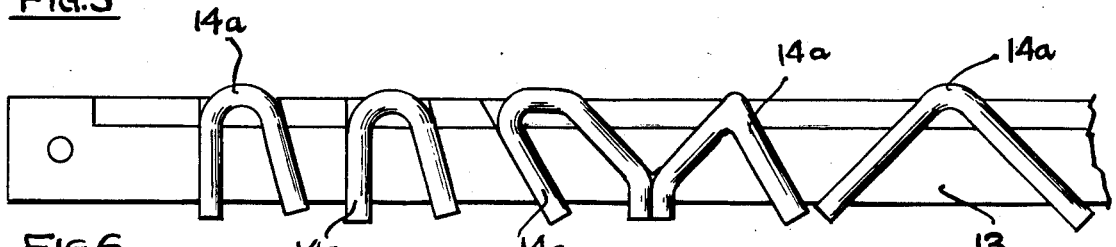
FIG. 6 is a top plan view showing the tubing sections installed in the mold.

Referring now to the Figures, the method of the invention will now be described. First as shown in FIG. 2, a Teflon rod 11 is inserted in an elongated piece of plastic tubing (spaghetti) 14, this tubing typically being of nylon; this rod being inserted to prevent the plugging of the tubing during the molding process. The tubing is than cut up into small sections as shown in FIG. 3, these sections having various predetermined lengths. These sections form grommets 14a which are then installed in a mold 13, the mold being shown in FIG. 5 and the installation of the sections therein being shown in FIG. 6; various size section being installed in various corresponding slot sections 13a of the mold. Mold 13 has a plurality of such slot sections 13a, each in the general form of a "U" or "V" and running at various different predetermined angles. An epoxy resin filler is than placed in the mold a top plate (not shown) being placed over mold cavity 13. The mold is then heated at approximately 350 F. degrees for about fifteen minutes so as to form an elongated strip 20 with the tubing sections molded therein. The curing process also tends to stress relieve the tubing sections.

Figure 7:
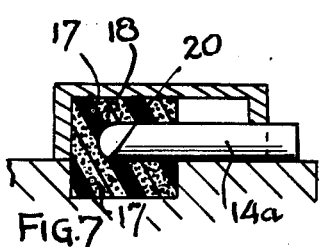
FIG. 7 is an end elevational view in cross section showing the joining of wire to the elongated strip by means of a plastic foam.
Figure 8:
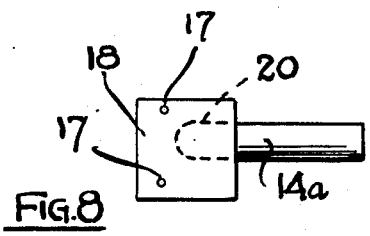
FIG. 8 is an end elevational view illustrating the elongated strip removed from the mold.

The elongated plastic strip thus formed is then inserted in a second mold (23 See FIG. 7) having a pair of wires 17 installed therein and running the entire length of the longitudinal extent of the mold and beyond the ends of the strip. Polyurethane foam is then placed in the second join to form a core 18 which is used to mold wires 17 to one side of strip 20 to retain these wires to the strip 20 with the ends of the wires protuding from the core. Urethane foam is mixed for about ten seconds and then poured into the mold cavity and the mold clamped shut. Curing will occur in about ten minutes at which time the molded part (See FIG. 8) is removed from the mold.

Figure 11:
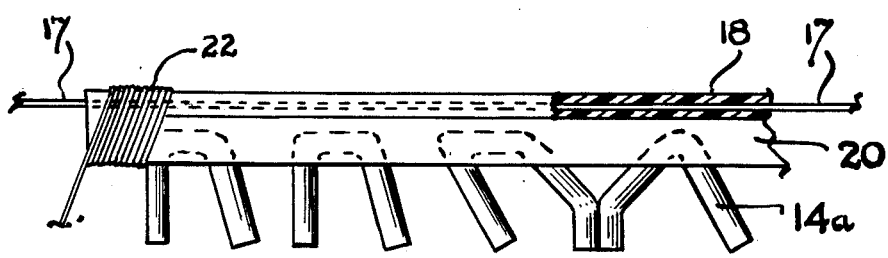
FIG. 11 illustrates the strip with wires held to the back thereof by plastic foam being rotated by the wires to wind plastic fibers therearound.

The elongated strip 20 with the foam backing 18 holding wires 17 molded thereto, is then suspended at its ends by means of wires 17 and rotated manually to wind continuous epoxy impregnated graphite fibers 22 therearound at an angle of about 20° from the longitudinal axis of the strip, the graphite fibers being fed from a drum and guided manually onto the core as it is rotated (See FIG. 11). After the fibers have been completely wound around the core, wires 17 are drawn from the core. The graphite wound core is than placed in a mold having the appropriate shape and the graphite material molded in conventional fashion, as is well known in the art, and as shown and described, for example in connection with FIGS. 2 and 3 of U.S. Pat. No. 3,787,051 issued Jan. 22, 1974. The Teflon rods are then removed from the tubing and the tubing trimmed as may be necessary. The foam which is thus built into the racquet frame serves as a vibration dampener.

Figure 9:
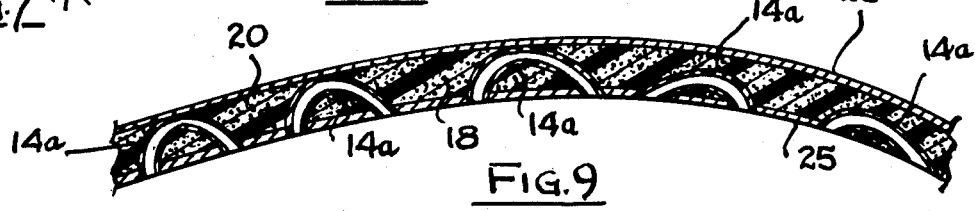
FIG. 9 is an cross sectional view illustrating a portion of a tennis racquet frame formed by the method of the invention.
Figure 10:
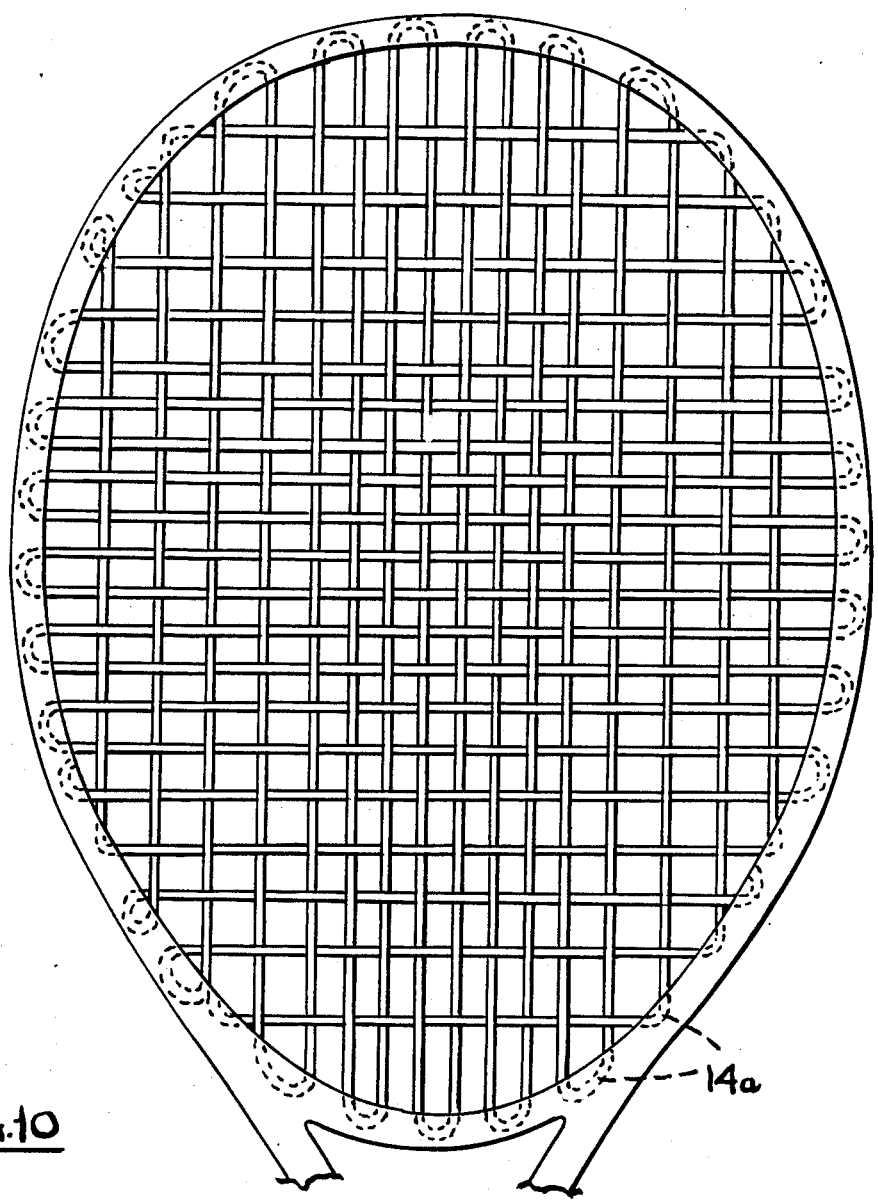
FIG. 10 is a top plan view of a tennis racquet formed by the method of the invention illustrating the stringing thereof through the frame.

The racquet thus formed has the tubing inserts or grommets installed therein these grommets having optimum curvature for minimum stress on the, strings. FIG. 9 is a cross sectional view showing the grommets 14a installed in place in the molded graphite 25 and epoxy strip 20 of the finished racquet frame. FIG. 10 illustrates the stringing of the racquet through these grommets.

Thus, the method of the invention enables the fabrication of a tennis racquet with a frame made of a plastic such as graphite with the stringing grommets installed internal to the frame in the fabrication thereof; these grommets having optimum curvatures for minimum strain on the strings.

While the invention has been described and illustrated in detail, it is to be clearly understood that is intended by way of illustration example only and is not to be taken by way of limitation, the spirit and scope of this invention being limited only by the terms of the following claims.

I claim:

1. A method for fabricating a racquet frame comprising the steps of
   forming a plurality of grommets of predetermined lengths,
   bending said grommets into various predetermined different generally "U" or "V" shapes running at various different angles,
   molding said grommets with a plastic filler into an elongated strip,
   winding plastic impregnated fibers completely around said strip through the entire longitudinal extent thereof and
   molding the plastic impregnated fiber wound strip into a desired shape to form the frame with the grommets molded therein.

2. The method of claim 1 and further including the step of attaching wire means along one of the longitudinal sides of the strip and extending beyond the opposite ends thereof, the plastic fibers being wound around the strip by suspending the strip from the opposite wire ends and rotating the strip with the wire means while the fibers are fed thereto.

3. The method of claim 2 wherein the wire means is attached to the strip by molding thereto with a plastic foam material.

4. The method of claim 1 and additionally including the initial step of installing rod means in each of said grommets to prevent the entry of plastic therein and removing said rod means from the grommets after the final molding has been completed.

5. A method for fabricating a racquet frame comprising the steps of
   cutting plastic tubing into a plurality of sections of various predetermined lengths to form grommets,
   installing said grommets in a first elongated mold having a plurality of slot sections, each in the general form of a "U" or "V" and running at various different angles, said grommets being installed in preselected corresponding slot sections,
   placing a plastic filler in said first mold and molding said grommets into an elongated unitary strip,
   installing wire means in a second elongated mold, said wire means running along the entire longitudinal entent of said second mold and therebeyond at both ends of the mold,
   placing one entire longitudinal side of said elongated strip in said second attach,
   placing plastic foam in said second mold to mold said wire means to said one side of said strip,
   suspending said strip from said wire means and winding plastic impregnated fibers completely therearound, and
   molding said strip with the plastic fibers therearound into the desired form of said racquet frame with the grommets molded within said frame.

6. The method of claim 5 and additionally including the steps of installing rod means into said grommets prior to installation in said first mold to prevent the entry of plastic material therein and removing said rods from the grommets after final molding has been completed.

7. The method of claim 5 wherein said plastic filler is of epoxy resin.

8. The method of claim 7 wherein the plastic foam is of polyurethane.

9. The method of claim 8 wherein the plastic fibers are of graphite.

10. The method of claim 5 wherein the wire suspended strip is rotated to wind the fibers therearound.

* * * * *